US009836110B2

(12) United States Patent
Mickelsen

(10) Patent No.: US 9,836,110 B2
(45) Date of Patent: Dec. 5, 2017

(54) APPARATUS, SYSTEMS AND METHODS FOR LEARNING A CRITICAL VOLTAGE OF A MICROPROCESSOR CONTROL UNIT

(75) Inventor: Jeremy Mickelsen, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 756 days.

(21) Appl. No.: 12/712,936

(22) Filed: Feb. 25, 2010

(65) Prior Publication Data

US 2011/0208456 A1    Aug. 25, 2011

(51) Int. Cl.
*G01R 19/00* (2006.01)
*G06F 1/30* (2006.01)
*G06F 11/14* (2006.01)

(52) U.S. Cl.
CPC ............ *G06F 1/30* (2013.01); *G06F 11/1441* (2013.01)

(58) Field of Classification Search
CPC ....... G06F 1/30; G01R 19/0092; G01R 19/25; G01R 19/2513
USPC .......................................................... 702/64
See application file for complete search history.

(56) References Cited

U.S. PATENT DOCUMENTS

| 5,086,501 | A |   | 2/1992 | DeLuca et al. |
| 5,805,473 | A | * | 9/1998 | Hadderman ................... 713/321 |
| 2005/0188230 | A1 |   | 8/2005 | Bilak |
| 2008/0086659 | A1 | * | 4/2008 | Ishikawa et al. ............... 714/22 |
| 2008/0234957 | A1 | * | 9/2008 | Banhegyesi et al. ........... 702/64 |

* cited by examiner

*Primary Examiner* — Michael Nghiem
(74) *Attorney, Agent, or Firm* — Lowe Graham Jones PLLC

(57) ABSTRACT

A microcontroller-based electronic device and its operating methods are operable to learn a critical voltage value for a microprocessor control unit residing in the microcontroller-based electronic device. The microprocessor control unit receives power from a battery. An exemplary embodiment detects an operating voltage provided to the microprocessor control unit by a supplemental power reservoir after removal of the battery, stores information corresponding to a value of the operating voltage in a nonvolatile memory, repeats the detecting and the saving information as the operating voltage decays in response to a discharge of the supplemental power reservoir, and determines the actual minimum operating voltage for the microprocessor control unit based on a last one of the stored information corresponding to the value of the operating voltage. A learned critical voltage value is based upon the defined actual minimum operating voltage.

17 Claims, 2 Drawing Sheets

APPARATUS, SYSTEMS AND METHODS FOR LEARNING A CRITICAL VOLTAGE OF A MICROPROCESSOR CONTROL UNIT

BACKGROUND

Media devices, such as a set top box, stereo, television, computer system, game system, or the like, are often configured to receive operating instructions from a user via a remote control. The remote control communicates user instructions to the media device using an infrared signal, radio signal, or other suitable wireless signal.

The remote control typically is powered from a battery or other portable power source. Over time and use, the battery discharges to a point where it is no longer able to provide sufficient power for correct operation of the remote control. When such low power situations arise, a microcontroller that controls operation of the remote control is typically placed in a reset mode. Prior to entering the reset mode, information critical to operation of the microcontroller is actively stored in a non-volatile memory device. At some point, the battery is replaced and/or recharged, such as when the user removes the discharged batteries and replaces them with new, fully charged batteries.

An abrupt complete loss of power is very undesirable, as information stored in a non-volatile memory device used by the microcontroller may be lost. For example, the user might remove the batteries prior to the microcontroller saving critical operating information. When the user removes the batteries, all power to the microcontroller is abruptly removed, any data save processes running will be in an unknown state.

One or more voltage detection circuits may be used to monitor voltage provided by the battery and/or the capacitor so that the microcontroller can take appropriate protective actions to preserve critical functions and/or information when power levels are determined to be close to the point at which data saves are unreliable, or operation becomes unreliable. The saving of critical information and/or entry into reset mode by the microcontroller is based on the detected operating voltage dropping to a predefined voltage usually referred to as the "critical voltage".

Due to variations from one remote control to the next remote control, the predefined critical voltage is determined by design and/or by testing of sample devices. To account for device manufacturing tolerances, voltage margins are added so that the microcontroller has a reliable amount of power for entry into reset mode. Thus, the designed critical voltages are predefined at higher values than the actual minimum voltage at which the microcontroller must save critical data or enter reset to avoid damage, loss of vital information, and/or incorrect operation.

The above-described variations between remote controls may be caused, for example, by semiconductor process variation, variations in device loadings, and/or time delays of interval voltage detection circuits. As a consequence, the optimum critical voltage may vary from one remote control to another.

Similar problems may be encountered in other types of microcontroller-based electronic devices that operate on battery power. Accordingly, there is a need in the arts to more accurately determine the optimal critical voltage at which the microcontroller must save data and/or begin entry into a safe or reset mode to avoid damage and/or loss of vital information.

SUMMARY

Systems and methods of determining a critical voltage value for a microprocessor control unit residing in the microcontroller-based electronic device are disclosed. The microprocessor control unit receives power from a battery. An exemplary embodiment detects an operating voltage provided to the microprocessor control unit by a supplemental power reservoir after removal of the battery, stores information corresponding to a value of the operating voltage in a nonvolatile memory, repeats the detecting and the saving information as the operating voltage decays in response to a discharge of the supplemental power reservoir, and determines the actual minimum operating voltage for the microprocessor control unit based on a last one of the stored information corresponding to the value of the operating voltage. A learned critical voltage value is based upon the defined actual minimum operating voltage.

BRIEF DESCRIPTION OF THE DRAWINGS

Preferred and alternative embodiments are described in detail below with reference to the following drawings.

DETAILED DESCRIPTION

Figure 1:
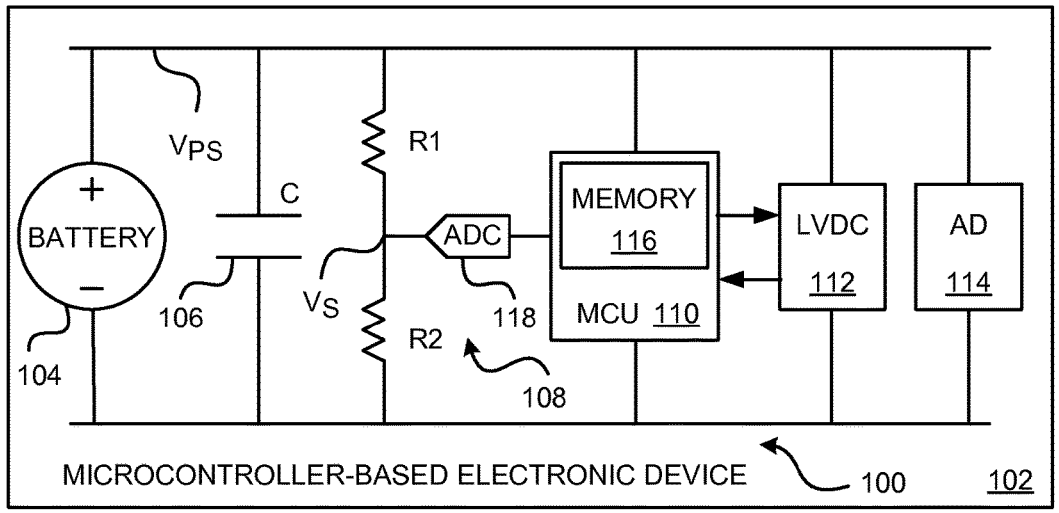
FIG. 1 is a block diagram of an exemplary embodiment of a critical voltage learning system.

FIG. 1 is a block diagram of an embodiment of a critical voltage learning system 100 implemented in a microcontroller-based electronic device 102, such as, but not limited to, a remote control. Embodiments of the critical voltage learning system 100 may be implemented in other types of microcontroller-based electronic devices, such as, but not limited to, stereos, radios, televisions (TVs), digital video disc (DVD) players, digital video recorders (DVRs), game playing devices, or personal computers (PCs) that are configured to receive power from a battery 104. Accordingly, the exemplary embodiment of the microcontroller-based electronic device 102 includes a variety of other components not illustrated or described herein.

An embodiment of the critical voltage learning system 100 is implemented in the microcontroller-based electronic device 102. The microcontroller-based electronic device 102 comprises a battery 104, a supplemental power reservoir 106, an optional voltage divider circuit 108, a microprocessor control unit (MCU) 110, a low voltage detection circuit (LVDC) 112, and an optional alert device (AD) 114. A memory 116 resides in the microprocessor control unit 110. Memory 116 is a non-volatile memory type device. Alternatively, memory 116 may reside in another suitable location.

In the exemplary embodiment, the supplemental power reservoir 106 is a capacitor (C) that is arranged in parallel with the battery 104. When the battery 104 is removed for recharging and/or replacement, the stored charge in the supplemental power reservoir 106 may provide a relatively small amount of power that is available for a short duration.

A predefined minimum operating voltage threshold based on device design is initially used to determine a predefined critical voltage. When an operating voltage provided by the power source voltage $V_{PS}$ decreases to the predefined critical voltage, the microprocessor control unit 110 operates to save any stale data and enter into the reset or safe mode. This situation may occur in the event of normal battery discharge, such as when the battery 104 "wears out" and no longer has sufficient power to support operation of the microprocessor control unit 110. However, the actual minimum operating voltage may be different from device to device for a variety of reasons, such as, but not limited to, manufacturing tolerances of the various components of the microcontroller-based electronic device 102. Thus, the predefined minimum operating voltage is initially defined at a higher value than the actual minimum voltage protection threshold at which the microprocessor control unit 110 must have completed the protective precautions to avoid damage and/or loss of vital information.

The low voltage detection circuit 112 is configured to monitor the supply voltage and generate an interrupt, or reset when the power source voltage $V_{PS}$ decays to the preset minimum operating voltage limit. The low voltage detection circuit 112 may reside within the microcontroller 110 in some embodiments.

The exemplary embodiment of the critical voltage learning system 100 includes the voltage divider circuit 108 that comprises a first resistor (R1) and a second resistor (R2). In some embodiments, the resistors R1 and/or R2 may be replaced with non linear components, such as, but not limited to, diodes and/or current limiting devices. Also, in some embodiments, the voltage divider circuit 108 may be enabled or disabled by a control line from the microcontroller, for example. A voltage $V_S$ is sampled, sensed, or detected by the analog to digital converter (ADC) 118, which generates a digital value corresponding to the operating voltage. Filter components (not shown) that are appropriate or necessary for the ADC may be optionally included. Preferably, a time constant of the filter should be as short as reasonable for the ADC. Alternatively, or additionally, the bulk capacitance C can be made relatively large so the time constant of Vps is at least as large as for the monitored voltage $V_S$.

The monitored voltage $V_S$ is used by the microprocessor control unit 110 for a variety of operating functions. For example, but not limited to, the microprocessor control unit 110 may sense a low battery charge condition. In some embodiments, the microprocessor control unit 110 actuates the alert device 114 so that the user is notified that the charge on the battery 104 has decreased to a level where normal operation of the microcontroller-based electronic device 102 cannot be supported, or can only be supported for a short continuing period. In such embodiments, the alert device 114 may be a suitable lamp or the like that emits light, may be a speaker or the like that emits an audible tone, and/or may be configured to generate a visible message on a display device. Thus, the user can appreciate that the battery 104 should be replaced and/or recharged.

In the exemplary embodiment, the voltage divider circuit 108 is communicatively coupled to the microprocessor control unit 110 and receives the monitored voltage $V_S$ (or information corresponding thereto). The voltage detection circuit 112 receives the monitored voltage $V_S$ (or information corresponding thereto). The low voltage detection circuit 112, in an alternative embodiment, may have its own dedicated voltage sensing circuitry (not shown) that is configured to sense the power source voltage $V_{PS}$. The low voltage detection circuit 112 typically provides a discrete signal to the microprocessor control unit 110 to indicate that the supply voltage is at or below safe operation. The provided signal that corresponds to a detected low voltage may be implemented as an interrupt and/or reset signal, depending on the embodiment.

Figure 2:
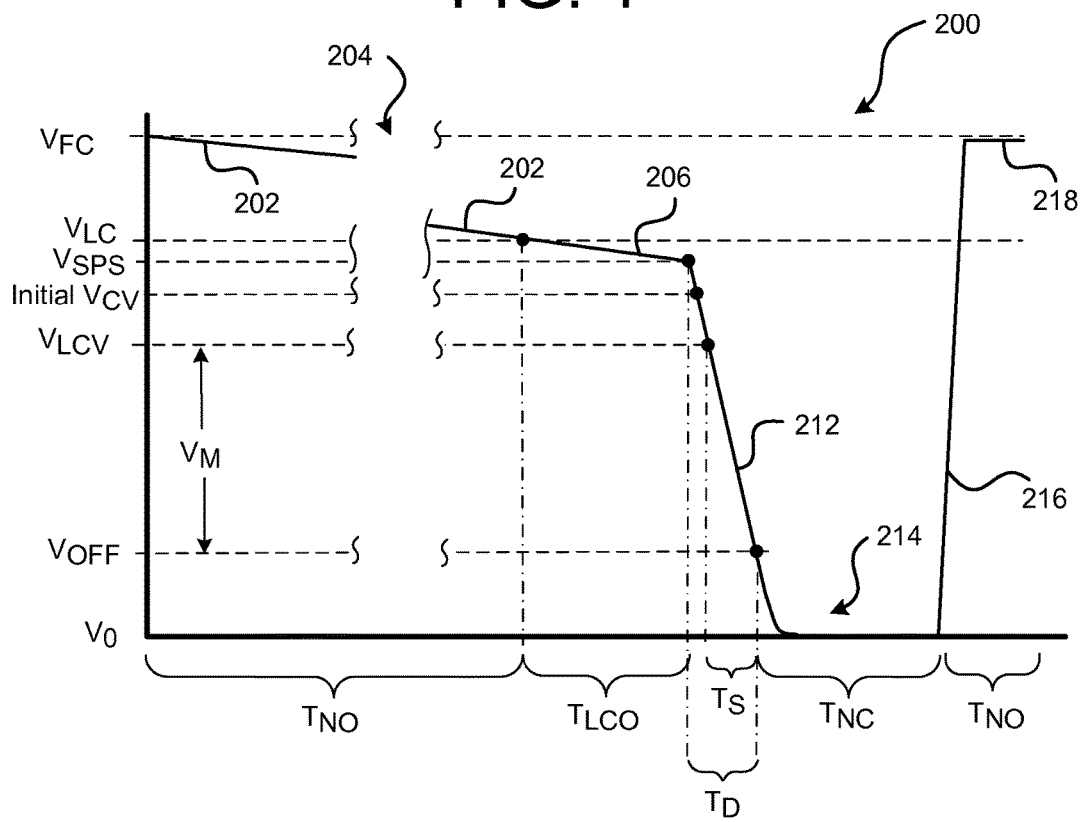
FIG. 2 is a hypothetical voltage plot of the power source voltage during operation of a microcontroller-based electronic device.

FIG. 2 is a hypothetical voltage plot 200 of the power source voltage $V_{PS}$ during operation of the microcontroller-based electronic device 102. Alternatively, the plot 200 may correspond to the monitored voltage $V_S$.

When the fully charged battery 104 is installed in the microcontroller-based electronic device 102, the power source voltage $V_{PS}$ is at a fully charged voltage ($V_{FC}$). As the microcontroller-based electronic device 102 is operated, charge (power) is drawn from the battery 104 such that the power source voltage $V_{PS}$ gradually decays. At some point during use of the microcontroller-based electronic device 102, the power source voltage $V_{PS}$ decays down to a low charge voltage ($V_{LC}$). When the microcontroller-based electronic device 102 is operating during this period of normal operation ($T_{NO}$), the power source voltage $V_{PS}$ is within a predefined normal operation range, as denoted by the voltage plot portion 202. The period of normal operation may last a relatively long time depending upon actual usage of the microcontroller-based electronic device 102 and/or the amount of power initially stored in the battery 104. (To conceptually illustrate the relatively long normal operating period, a time period discontinuity region 204 is illustrated in the voltage plot 200.)

At some point in time, the operating voltage decays to the predefined low charge voltage $V_{LC}$. The microcontroller-based electronic device 102 is configured to operate, either fully or partially, after the power source voltage $V_{PS}$ decreases below the low charge voltage $V_{LC}$, as denoted by the voltage plot portion 206. During this period of low charge operation ($T_{LCO}$), the alert device 114 may be activated to indicate that the battery 104 should be removed for recharging and/or replacement.

With continued operation, the power source voltage $V_{PS}$ eventually decays to the critical voltage. Upon crossing this critical voltage threshold, the microcontroller-based electronic device 102 saves any pertinent data and prevents the generation of new data that would require saving. That is, the microcontroller-based electronic device 102 protects critical data by going into a "safe" or reset mode. Further, protection of the critical data may also be implemented by restricting operation of the microcontroller-based electronic device 102.

Initially, the critical voltage is a predefined value. That is, before the critical voltage has been learned in situ, the initial critical voltage is predefined. This critical voltage should be set to a value higher than the highest expected measured critical voltage value in the factory or by another mechanism such as a firmware change. This critical voltage is denoted as the initial $V_{CV}$ in FIG. 2.

When embodiments learn the critical voltage $V_{CV}$, the microprocessor control unit 110 will enter a low a power state. For example, the microprocessor control unit 110 may operate with a reduced operating frequency. Embodiments periodically sample the power source voltage $V_{PS}$ and store the measurements (either in non-volatile memory, such as in a random access memory (RAM), that can be maintained in sleep and/or low voltage states. In alternative embodiments, the low voltage detection circuit 112 may be configured to drive an interrupt instead of a reset.

In this constantly periodic sampling state, the battery 104 is removed from the microcontroller-based electronic device 102, either by user intervention or circuitry. For example, on screen instructions could be used to guide the user through this sequence.

The power source voltage $V_{PS}$ will drop (decay) relatively quickly compared to when the batteries 104 are in the microcontroller-based electronic device 102 At some point during the voltage drop, the microprocessor control unit 110 will receive the interrupt from the low voltage detection circuit 112, or be reset. At this point, the periodic sampling of monitored voltage $V_S$ stops. The last stored monitored voltage $V_S$ value contains the voltage just prior to the low voltage detection threshold. This value can then be used directly as the new learned critical voltage, or can be used to calculate a learned critical voltage with added margin ($V_{LCV}$ in either case). Additionally, other parameters, such as a low charge voltage or other voltage of interest, may also be adjusted based on the learned critical voltage $V_{Lcv}$.

Although the learned critical voltage $V_{LCV}$ needs to be measured only once (provided no significant component degradation occurs), the learned critical voltage $V_{LCV}$ can be re-measured any time. For example, the microcontroller-based electronic device 102 and/or the microprocessor control unit 110 may be configured to measure and determine the learned critical voltage $V_{LCV}$ on a predefined, periodic basis, after a number of predefined operations, and/or after a predefined duration of operation.

When the detected operating voltage decays to the learned critical voltage $V_{LCV}$, an interrupt event, a special handling routine or the like is invoked that causes the microprocessor control unit 110 to enter into a reset mode of operation. The operating voltage continues to decay from the learned critical voltage $V_{LCV}$ to the off voltage $V_{OFF}$, as denoted by the voltage plot portion 212. By the time that the operating voltage has decayed to the off voltage $V_{OFF}$, denoted by the duration $T_S$, the microprocessor control unit 110 has saved any necessary data and entered reset or a safe mode. When the operating voltage is less than the off voltage $V_{OFF}$, as denoted by the voltage plot portion 214, insufficient operating voltage is available for operation of the microprocessor control unit 110. Eventually, the supplemental power reservoir 106 becomes fully discharged and provides very low voltage to no voltage, as denoted by the voltage plot portion 214.

After some duration of time (denoted by the period of no charge, $T_{NC}$) after the battery 104 has been removed, the user then inserts a new or recharged battery 104 into the microcontroller-based electronic device 102. The operating voltage then rapidly rises to the fully charged operating voltage $V_{FC}$, as denoted by the voltage plot portion 216. The microcontroller-based electronic device 102 may then resume operation at an operating voltage that is within its normal operating range, as denoted by the voltage plot portion 218.

Figure 3:
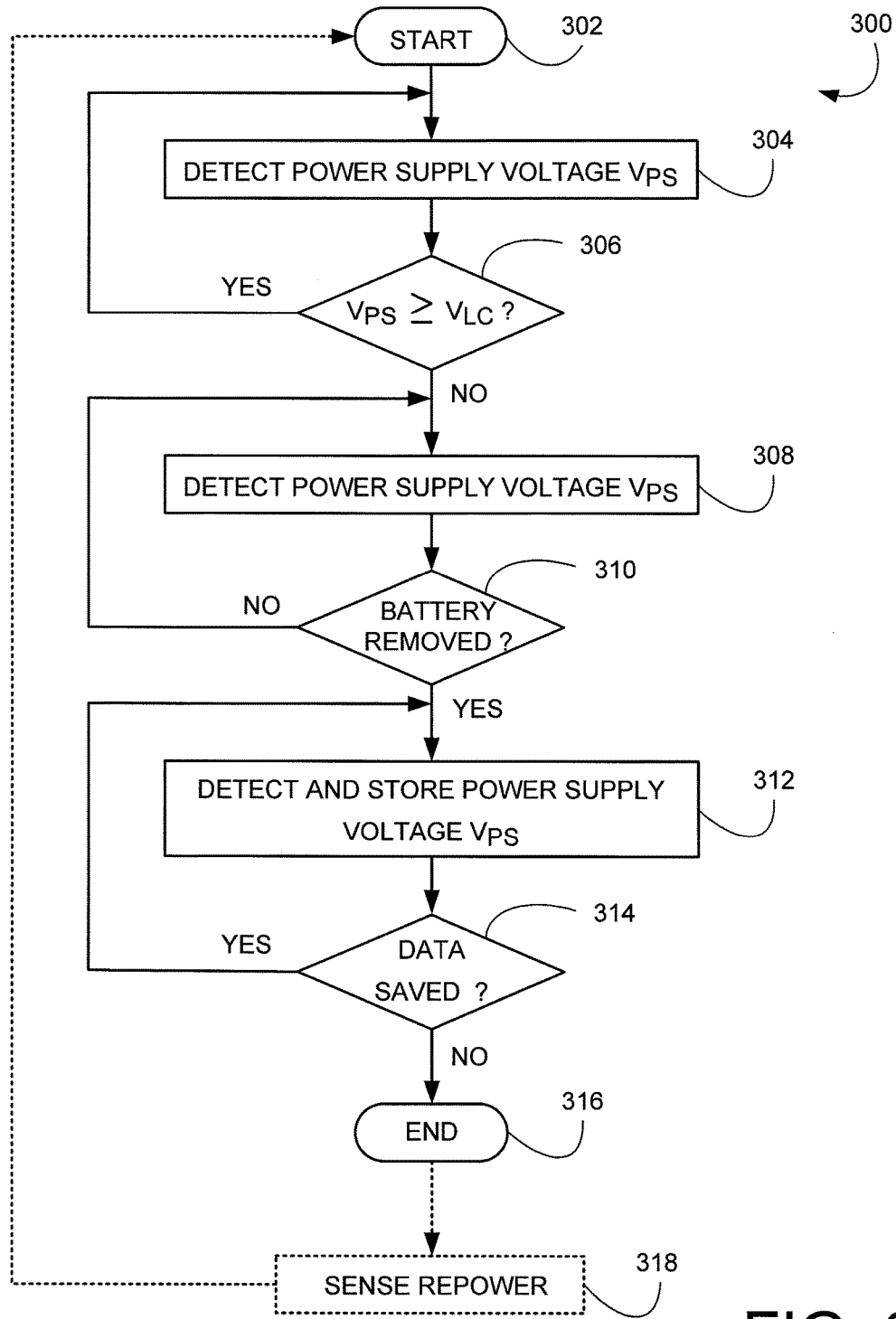
FIG. 3 is a flow chart illustrating a process for learning the learned critical voltage.

FIG. 3 is a flow chart 300 illustrating a process for learning a value of the learned critical voltage $V_{LCV}$. The flowchart 300 shows the architecture, functionality, and/or operation of a possible implementation of the software or firmware for implementing the critical voltage learning system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 3, may include additional functions, and/or may omit some functions. For example, two blocks shown in succession in FIG. 3 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

The process of the flowchart 300 starts at block 302, for example, in response to the starting or powering up of the microcontroller-based electronic device 102. At block 304, the power source voltage $V_{PS}$ is detected. At block 306, a decision is made whether the detected power source voltage $V_{PS}$ is greater than or equal to the low charge operating voltage $V_{LC}$. If the detected power source voltage $V_{PS}$ is greater than or equal to the low charge operating voltage $V_{LC}$ (the YES condition), the process loops back to block 304. If the detected power source voltage $V_{PS}$ is less than the low charge operating voltage $V_{LC}$ (the NO condition), the process proceeds to block 308. Accordingly, the operating voltage (or alternatively, the monitored voltage $V_S$) is continuously monitored or is periodically monitored, depending upon the embodiment. This exemplary embodiment detects when the operating voltage decays to the predefined low charge operating voltage $V_{LC}$ as charge (power) is drawn from the battery 104. The predefined low charge operating voltage $V_{LC}$ defines the lower end of the operating voltage range at which the microcontroller-based electronic device 102 may operate for its intended use. In some embodiments, the value of the low charge operating voltage $V_{LC}$ is based on design of the microcontroller-based electronic device 102.

At block 308, the power source voltage $V_{PS}$ continues to be detected. At block 310, a determination is made whether the battery 104 has been removed. If the battery 104 has not been removed (the NO condition), the process loops back to block 308. If the battery 104 has been removed (the YES condition), the process proceeds to block 312. Accordingly, the presence of the battery 104 is continuously monitored or is periodically monitored, depending upon the embodiment. In this exemplary embodiment, the power source voltage $V_{PS}$ is monitored to determine if the battery 104 has been removed. For example, a relatively large and fast drop in the power source voltage $V_{PS}$ may indicate that the battery 104 has been removed since the supplemental power reservoir 106 looses its charge (and thus decreases in its output voltage) more rapidly if the battery 104 is not present. In other embodiments, a high rate of change in the power source voltage $V_{PS}$ may indicate that the battery 104 has been removed. In other embodiments, a switch or other sensor may sense physical presence of the battery 104. Any suitable means of detecting that the battery 104 has been removed may be used.

At block 312, the power source voltage $V_{PS}$ continues to be detected, and a value of the power source voltage $V_{PS}$ is stored in a memory, such as the memory 116 of the microprocessor control unit 110 (FIG. 1). Preferably, the power source voltage $V_{PS}$ is stored in the same non-volatile type memory device where other data is stored by the microprocessor control unit 110 during entry into the reset or safe mode. That is, while the microprocessor control unit 110 is shutting down and saving various operational data for later retrieval, the low voltage detection circuit 112 is monitoring and storing information corresponding to the detected power source voltage $V_{PS}$ as the supplemental power reservoir 106 is discharged.

In other embodiments, the value of the power source voltage $V_{PS}$ may be stored in another suitable memory device. For example, but not limited to, the value of the power source voltage $V_{PS}$ may be stored in a register or the like. Preferably, the memory device where the power source voltage $V_{PS}$ is stored is a non-volatile type memory.

After the value of the currently detected power source voltage $V_{PS}$ is stored, the process continues to the optional block 314. In the exemplary process of flow chart 300, a determination is made at block 314 whether the data was properly saved. That is, the stored data is verified. Verification can be performed in any suitable manner. For example, the data can be retrieved to determine if all data bit fields were recorded. Alternatively, or additionally, the data can be compared with previous data to assess if a change in the value of the voltage is within a predefined range that corresponds to an expected voltage decay rate as the supplemental power reservoir 106 discharges. Another embodiment may compare the value of the voltage to some magnitude, for example, but not limited to, a known voltage wherein no valid data can be saved.

If the stored data is verified (the YES condition), the process loops back to block 312. While this part of the process occurs, the power source voltage $V_{PS}$ continues to decay as the supplemental power reservoir 106 discharges. Accordingly, the current power source voltage $V_{PS}$ is detected and then stored. The data is retrieved for verification, and the process continues until the data verification fails. That is, when the stored data is no longer valid, the actual minimum operating voltage of the microprocessor control unit 110 has been identified.

If at block 314 either the data cannot be verified (the NO condition) or the microcontroller cannot continue and operation proceeds to block 316 and ends. It is appreciated that the microprocessor control unit 110 may be in reset mode. At some point, the recharged or new battery 104 is installed in the microcontroller-based electronic device 102. The power source voltage $V_{PS}$ is restored to its normal operating range (above the low charge operating voltage $V_{LC}$). At block 318, the restoration of power sensed. The process is then started over at block 302.

In an alternative embodiment, the verification process of block 314 is omitted. Data corresponding to the value of the power source voltage $V_{PS}$ is continuously, or periodically, stored as the power source voltage $V_{PS}$ decays. When the power source depletes to a level below that which can sustain normal operation no more values are stored, and the last saved data corresponds to the critical voltage Once operation of the microcontroller-based electronic device 102 begins after replacement of the battery 104, the last stored value of the power source voltage $V_{PS}$ may be retrieved. The retrieved last stored value of the power source voltage $V_{PS}$ corresponds to the actual minimum operating voltage at which the microcontroller-based electronic device 102 would have completed entry into the reset or safe mode. Thus, an exemplary embodiment defines the last one of the stored information corresponding to the value of the supplemental power reservoir voltage $V_{SPS}$ as the actual minimum operating voltage for the microprocessor control unit 104.

Accordingly, learned critical voltage $V_{LCV}$ can be determined using the value of the last stored power source voltage $V_{PS}$. In an exemplary embodiment, the learned critical voltage $V_{LCV}$ equals the value of the last stored power source voltage $V_{PS}$ plus an amount of voltage margin ($V_M$). The voltage margin $V_M$ allows the supplemental power reservoir 106 to provide a sufficient amount of power to the microprocessor control unit 110 during the time that is required to complete any necessary data saves prior to reset or safe mode after the interrupt voltage event is issued. That is, when the power source voltage $V_{PS}$ decays to the learned critical voltage $V_{LCV}$, the interrupt voltage event is generated to cause the microprocessor control unit 110 to begin data saves and/or shut down. When the interrupt voltage event is generated, there is sufficient charge remaining in the supplemental power reservoir 106 to enable the microprocessor control unit 110 to successfully complete data saves and/or shut down.

In some embodiments, a predefined amount of voltage margin may be added to the value of the learned critical voltage $V_{LCV}$ and/or the value of the last stored power source voltage $V_{PS}$ to ensure that adequate charge is available from the supplemental power reservoir 106 for the microprocessor control unit 110.

In some embodiments, each time the battery 104 is replaced (such that a complete loss of power occurs), the low voltage detection circuit 112 learns a current actual minimum operating voltage, which is defined by the value of the last stored power source voltage $V_{PS}$. Over time, a plurality of values of the last stored power source voltages $V_{PS}$ may be stored and compared with each other. Changes in the values of the last stored power source voltages $V_{PS}$ may indicate changes in the operating condition of various components, such as the supplemental power reservoir 106, the microcontroller-based electronic device 102, and/or the memory 116. In such embodiments, suitable alerts or messages may be issued to indicate potential problems in the microcontroller-based electronic device 102.

In an alternative embodiment, other data is saved that corresponds to the detected power source voltage $V_{PS}$. Here, any data may be saved each time the process of learning the actual minimum operating voltage is performed at blocks 312-316 (FIG. 3). In such embodiments, the value of the last stored power source voltage $V_{PS}$ is determined based on the stored data.

Some embodiments periodically learn the value of the learned critical voltage $V_{LCV}$, such as each time the battery 104 is removed. Other embodiments may only perform the learning process one time.

In other embodiments, the supplemental power reservoir 106 may comprise other power devices. For example, the supplemental power reservoir 106 may include an inductor, a super capacitor, a chemical battery, or another removable charge storing device.

Embodiments of the critical voltage learning system 100 may be implemented in microcontroller-based electronic devices 102 that have battery charging systems (not shown). At some point, the battery 104 will be eventually replaced when the battery life is used up. For example, the battery 104 may be replaced when it no longer is able to be recharged and/or when the battery 104 is only able to hold its charge for a relatively short, and undesirable, period of time.

It should be emphasized that the above-described embodiments of the critical voltage learning system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that determines an actual minimum operating voltage for a microprocessor control unit residing in a microcontroller-based electronic device, wherein at least the microprocessor control unit receives power from at least one battery residing within the microcontroller-based electronic device, the method comprising:

detecting removal of the battery from the microcontroller-based electronic device;

providing power to operate the microcontroller-based electronic device from a capacitor after removal of the battery, wherein the capacitor is arranged in parallel with the battery, and wherein the capacitor has been previously charged by the battery;

detecting, at a low voltage detection circuit, an operating voltage provided to the microprocessor control unit by the capacitor after removal of the battery;

storing operation data pertaining to operation of the microprocessor control unit in response to the detected operating voltage decaying to a predefined actual minimum operating voltage value and concurrently storing information corresponding to a currently detected value of the operating voltage of the capacitor in a nonvolatile memory; verifying that the stored operation data was properly saved;

repeating, in response to verifying that the operation data was properly saved, the detecting of the operating voltage, the storing of the operation data, and the storing of the currently detected value of the operating voltage of the capacitor as the operating voltage of the capacitor decays in response to a discharge of the capacitor, wherein the repeating continues until operation of the microprocessor control unit fails, wherein the operating voltage is stored as the operation data;

detecting an insertion of one of a new battery or the battery after recharging into the microcontroller-based electronic device, wherein the microprocessor control unit restarts operation;

retrieving, in response to the restarted operation of the microprocessor control unit, a last stored value of the operating voltage of the capacitor; and changing the predefined actual minimum operating voltage value to a new actual minimum operating voltage value based on the retrieved last stored value of the operating voltage of the capacitor.

2. The method of claim 1, further comprising:
defining a learned critical voltage, wherein the learned critical voltage is the new value of the actual minimum operating voltage.

3. The method of claim 2, further comprising:
replacing a stored predefined critical voltage with the learned critical voltage.

4. The method of claim 2, wherein the learned critical voltage is defined as the value of the actual minimum operating voltage.

5. The method of claim 2, wherein the learned critical voltage is based upon the value of the actual minimum operating voltage plus a voltage margin.

6. The method of claim 2, further comprising:
monitoring the operating voltage of the capacitor; and
generating an interrupt event in response to the monitored operating voltage of the capacitor decaying to the learned critical voltage,
wherein the microprocessor control unit saves data in response to the generated interrupt event.

7. The method of claim 2, further comprising:
monitoring the operating voltage of the capacitor; and
generating an interrupt event in response to the monitored operating voltage of the capacitor decaying to the learned critical voltage,
wherein the microprocessor control unit begins shut down in response to the generated interrupt event.

8. The method of claim 2, further comprising:
defining a predefined critical voltage to correspond to the learned critical voltage.

9. The method of claim 1, wherein detecting removal of the battery comprises:
sensing a rapid voltage change, wherein the rapid voltage change corresponds to the discharge of the capacitor.

10. The method of claim 1, wherein prior to repeating, the method further comprising:
retrieving the value of the operating voltage; and
verifying the value of the operating voltage,
wherein the verifying indicates that the value of the operating voltage was successfully stored in the non-volatile memory.

11. A microcontroller-based electronic device that determines an actual minimum operating voltage for a microprocessor control unit residing in the microcontroller-based electronic device, the microcontroller-based electronic device comprising:
the microprocessor control unit;
a battery residing within the microcontroller-based electronic device and configured to provide an operating voltage to the microprocessor control unit;
a capacitor coupled in parallel to the battery and the microprocessor control unit, wherein the capacitor is configured to provide the operating voltage to the microprocessor control unit when the battery is removed from the microcontroller-based electronic device;
a low voltage detection circuit configured to periodically detect the operating voltage of the capacitor after removal of the battery; and
a non-volatile memory configured to store information corresponding to the detected operating voltage of the capacitor,
wherein the microprocessor control unit, after removal of the battery, is configured to:
store operation data pertaining to operation of the microprocessor control unit in response to the detected operating voltage decaying to a predefined actual minimum operating voltage value and concurrently storing information corresponding to a currently detected value of the operating voltage of the capacitor in a nonvolatile memory;
verifying that the stored operation data was properly saved; and
repeating, in response to verifying that the operation data was properly saved, the detecting of the operating voltage, the storing of the operation data, and the storing of the currently detected value of the operating voltage of the capacitor as the operating voltage of the capacitor decays in response to a discharge of the capacitor, wherein the repeating continues until operation of the microprocessor control unit fails, wherein the operating voltage is stored as the operation data;
wherein the microprocessor control unit, after replacement of the battery, is configured to:
restart operation of the microprocessor control unit, a last stored value of the operating voltage of the capacitor;
retrieve, in response to the restarted operation of the microprocessor control unit, a last stored value of the operating voltage of the capacitor; and
define a value of the actual minimum operating voltage based on the last stored value of the operating voltage of the capacitor.

12. The microcontroller-based electronic device of claim 11, wherein the last stored value of the actual minimum operating voltage is defined as a learned critical voltage.

13. The microprocessor control unit of claim 12, wherein a predefined critical voltage is replaced with the learned critical voltage.

14. The microcontroller-based electronic device of claim 12, wherein the learned critical voltage is defined based upon the value of the actual minimum operating voltage plus a voltage margin.

15. The system of claim 12, wherein the low voltage detection circuit monitors the operating voltage of the capacitor and generates an interrupt event to the microprocessor control unit in response to the monitored operating voltage of the capacitor decaying to the learned critical voltage, and wherein the microprocessor control unit begins entry into a reset mode in response to the generated interrupt event.

16. The microcontroller-based electronic device of claim 11, further comprising:
   a voltage divider circuit coupled to the battery and the capacitor, and configured to provide a sensed voltage that corresponds to the operating voltage of at least the capacitor; and
   an analogue to digital converter configured to convert the sensed voltage from the voltage divider circuit, and configured to provide a digital value to the microprocessor control unit that corresponds to the sensed voltage.

17. The microcontroller-based electronic device of claim 11, further comprising:
   an alert device,
   wherein the alert device is configured to issue an alert in response to the operating voltage of the battery decreasing to a low charge voltage, and
      wherein the alert indicates that the battery should be removed.

* * * * *